United States Patent
D'Evelyn et al.

(10) Patent No.: US 8,265,587 B2
(45) Date of Patent: Sep. 11, 2012

(54) SYSTEM AND METHOD FOR AMENDING INSTRUCTIONS FOR EMERGENCY AUXILIARY SERVICES FOLLOWING AN EMERGENCY SERVICES REQUEST

(75) Inventors: Linda Kaye D'Evelyn, Lafayette, CO (US); Edward Donald Schlein, Monument, CO (US); Peter Roy Schmidt, Westminster, CO (US); James Lee Potter, Westminster, CO (US); Laura Anne Marriott, Boulder, CO (US); Monica Ann Marics, Boulder, CO (US); Kirk R. Knudsen, Arvada, CO (US)

(73) Assignee: West Corporation, Omaha, NE (US)

( * ) Notice: Subject to any disclaimer, the term of this patent is extended or adjusted under 35 U.S.C. 154(b) by 1840 days.

(21) Appl. No.: 10/870,385

(22) Filed: Jun. 17, 2004

(65) Prior Publication Data
US 2005/0282518 A1   Dec. 22, 2005

(51) Int. Cl.
*H04M 11/04* (2006.01)
(52) U.S. Cl. .................................................. 455/404.1
(58) Field of Classification Search ................ 455/404.1
See application file for complete search history.

(56) References Cited

U.S. PATENT DOCUMENTS

| | | | |
|---|---|---|---|
| 5,195,126 A | 3/1993 | Carrier et al. | |
| 5,398,277 A | 3/1995 | Martin et al. | |
| 5,438,607 A * | 8/1995 | Przygoda et al. | 379/38 |
| 5,673,304 A | 9/1997 | Connor et al. | |
| 5,805,670 A | 9/1998 | Pons et al. | |
| 6,073,004 A | 6/2000 | Balachandran | |
| 6,151,385 A | 11/2000 | Reich et al. | |
| 6,427,001 B1 | 7/2002 | Contractor et al. | |
| 6,563,910 B2 | 5/2003 | Menard et al. | |
| 6,587,545 B1 | 7/2003 | Antonucci et al. | |
| 6,600,812 B1 | 7/2003 | Gentillin et al. | |
| 6,614,883 B2 * | 9/2003 | Baum et al. | 379/37 |
| 6,636,732 B1 * | 10/2003 | Boling et al. | 455/404.1 |
| 2002/0177428 A1 * | 11/2002 | Menard et al. | 455/404 |
| 2004/0102178 A1 * | 5/2004 | Williams | 455/404.1 |

* cited by examiner

*Primary Examiner* — Wesley Kim (57) ABSTRACT

A system for amending implementation instructions for any number or combination of Emergency Auxiliary Services, the Emergency Auxiliary Services being effected according to the implementation instructions regarding at least one predetermined receiver after a triggering communication is placed from a subscribing communication instrument includes: (a) A change ordering means for effecting the amending. The change ordering means is exercised by a service requesting entity using the subscribing communication entity. (b) An instruction amending means coupled with the subscribing communication entity. The instruction amending means responds to the change ordering means to effect the amending.

20 Claims, 4 Drawing Sheets

SYSTEM AND METHOD FOR AMENDING INSTRUCTIONS FOR EMERGENCY AUXILIARY SERVICES FOLLOWING AN EMERGENCY SERVICES REQUEST

BACKGROUND OF THE INVENTION

The present invention is directed to systems that provide Emergency Auxiliary Services in connection with a request for emergency services. Emergency Auxiliary Services include, by way of example and not by way of limitation, notification services systems (i.e., services that effect notification to predetermined callees when a request for emergency service is placed from a calling or communication instrument identified by a subscriber to such service), providing critical subscriber data (e.g., language preference, medical conditions or records, building and infrastructure layouts, photographs, locations of hazardous materials and similar information), concierge-type services and other types of services rendered in conjunction with an emergency services request.

In the present application, the term telecommunication system is intended to include at least PSTN (Public Switched Telephone Networks), wireless communication networks, PBX (private branch exchange) systems or networks, telematic systems (e.g., On Star™), communication over IP (Internet Protocol) networks using various wired and wireless communication devices, VoIP (Voice over Internet Protocol), interactive TV and other systems that support voice or data communications available to the public. Correspondingly, the term "emergency calls" in this application should be understood to apply to any emergency services request from any calling or communication instrument available to the public, such as a voice or data request using any one of the aforementioned technologies and requesting follow-up from emergency personnel.

Such an emergency services request will generally be submitted to a PSAP (Public Safety Answering Point) or similar facility that provides centralized dispatch for emergency first responders, such as police, fire, EMT (Emergency Medical Technician) or ambulance services, military personnel, national guard, coast guard, homeland security or hazardous materials response teams, etc. Alternatively, the PSAP may transfer the emergency services request to a second operator that provides dispatch services. Other emergency services requests such as those for Central Alarm Systems or for Personal Emergency Response Systems (PERS), may initially be evaluated by a human or system operator to determine of the validity of the emergency services request before passing control of the call onto the PSAP or other central emergency dispatch facility.

Provision of Emergency Auxiliary Services, including notification, following a 9-1-1 or other emergency call has been disclosed. The disclosed services are either automatically triggered by a 9-1-1 call or triggered by a follow-up information request by a PSAP (Public Safety Answering Point) or other emergency services personnel. For example, notification that a 9-1-1 call has occurred is disclosed as being automatically generated by monitoring voice telephone trunks in U.S. Pat. No. 5,195,126 to Carrier et al. for "Emergency Alert and Security Apparatus and Method", issued Mar. 16, 1993 (hereinafter referred to as "Carrier"); by monitoring SS7 messages in U.S. Pat. No. 6,427,001 B1 to Contractor et al. for "System and Method for Notification of 911 Telephone Calls using a Link Monitoring System", issued Jul. 30, 2002 (hereinafter refered to as "Contractor"); and by using an ALI (Automatic Location Identification) system trigger in U.S. Pat. No. 6,151,385 to Reich et al. for "System for the Automatic Notification that a 9-1-1 Call has Occurred", issued Nov. 21, 2000 (hereinafter referred to as "Reich").

Notification generated following a request by emergency services personnel is disclosed by U.S. Pat. No. 5,805,670 to Pons et al. for "Private Notification System for Communicating 9-1-1 Information", issued Sep. 8, 1998 (hereinafter referred to as "Pons"); and by U.S. Pat. No. 6,600,812 to Gentillin et al. for "Method and Apparatus for Providing Emergency Response Information" issued Jul. 29, 2003 (hereinafter referred to as "Gentillin").

Notification using a hybrid method, where an alternate embodiment of the current 9-1-1 ALI system identifies a notification subscriber but the PSAP call taker initiates the notification sequence, is disclosed by U.S. Pat. No. 6,587,545 to Antonucci et al. for "System for Providing Expanded Emergency Service Communication in a Telecommunication Network", issued Jul. 1, 2003 (hereinafter referred to as "Antonucci").

Sending critical subscriber data, such as subscriber language preference, medical conditions or records, building layouts from either a single database or from third party stores to public safety personnel, subscribers, or other third parties is described in Pons, Antonucci and Gentillin.

None of these patents disclose a method, procedure or system for an emergency service caller or other emergency call participant to cancel, suppress, or amend instructions for notification or other Emergency Auxiliary Services triggered by the call.

There are numerous patents disclosing Central Station Alarm or Personal Emergency Response (PERS) systems. In many of these systems, either an electronic sensor or a call button transmits an emergency services request signal to a central monitoring service operator. A human or computer operator evaluates the emergency services request signal and then contacts a Public Safety Answering Point (PSAP) to request emergency dispatch by First Responders (police, fire or EMT) to selected signals. These emergency signal requests are not automatically routed to PSAP dispatch centers in the same way as 9-1-1 calls made from wired or wireless phones today, although systems that could enable such interconnection in the future have been disclosed. Other Central Station Alarm or Personal Emergency Response (PERS) systems have been disclosed which interface with the PSTN (public safety telephone network) using either wired or wireless technologies to make a 9-1-1 call on behalf of a user who may not be able to complete an emergency call request due to disability or remoteness.

Because of very high numbers of false alarm triggers from sensor malfunction (e.g., over sensitivity, under sensitivity, open circuit) or accidental depression of buttons on hand-held emergency units or pendants, some of the disclosed systems for Central Station Alarm services or Personal Emergency Response Services (PERS) include an option for withdrawing or canceling an emergency services request. A system disclosed in U.S. Pat. No. 5,398,277 to Martin et al. for "Flexible Multiprocessor Alarm Data Processing System" (hereinafter referred to as "Martin") describes a system where Central Station Alarm data can be automatically routed to municipal authorities, such as a PSAP. This system also allows subscribers to access the system directly via telephone and enter a touch-tone identification code to cancel the emergency services request due to a false alarm. A system disclosed in U.S. Pat. No. 5,673,304 to Connor et al. for "Programmable Emergency Communication System Including Automatic Dialer" (hereinafter referred to as "Connor") describes an integrated home alarm and Personal Emergency Response system. This system includes 'cancel' button on both a hand held medallion and a central controller unit that 'beeps' for a limited period to remind a user to cancel the emergency services request in case the system was accidentally activated.

In a system disclosed in U.S. Pat. No. 6,563,910 to Menard et al. for "Emergency Response Information Distribution" (hereinafter referred to as "Menard"), the existing E9-1-1 system used by Public Safety Answering Points (PSAPs) in the U.S. could be replaced with a networked communication system using a website that integrates Central Station Alarm and PERS systems with a PSAP event database and dispatch system. This system allows authorized users, such as a residential owner or tenant, to directly access the networked communication system to cancel or confirm the emergency services request.

Systems have been disclosed to enable emergency services requests from telematic devices along with some means for the person involved in the emergency to cancel an emergency call request. A system disclosed in U.S. Pat. No. 6,073,004 to Balachandran for "Emergency Call Initiator" (hereinafter referred to as "Balachandran") describes a system and method for enabling emergency call initiations in response to the detection of a vehicle accident. This system sets a timer to a length of time enabling a passenger of the vehicle an opportunity to cancel the outgoing call sequence.

Martin, Connor, Menard, and Balachandran disclosed systems that allow users to amend instructions, typically by providing a cancellation input. However, the users of system disclosed by Martin, Connor, Menard and Balachandran can only cancel the emergency services request itself. Those disclosed systems cannot request performing Emergency Auxiliary Services which are triggered from the emergency services request call.

In a system disclosed in U.S. Pat. No. 6,614,883 to Baum et al. for "Emergency Call System" (hereinafter referred to as "Baum"), a user depresses a key or button on an emergency call unit or on a pendant that the user is wearing to initiate notification to a plurality of other parties using a pre-programmed message. The Baum system enables an emergency notification service and includes a cancel button for use when emergency services are inadvertently requested. Baum's system does not include a capability for placing an emergency services request sent to a PSAP or other emergency services personnel to request follow-up by emergency first responders.

According to an April 2003 poll completed by the Mentor Group on behalf of the National Emergency Number Association (NENA), more than 60% of 9-1-1 calls are completed by persons not directly involved in an emergency event (i.e., "Good Samaritans"), and more than 10% of all 9-1-1 calls are placed to report a public safety incident such as a bridge collapse or forest fire. At least some of this call activity by persons uninvolved in the reported emergency situation can be attributed to the growing number of "Good Samaritan" calls placed by wireless phone users who may, for example, call 9-1-1 to report an auto accident they pass on the highway. These Good Samaritan callers have intentionally made an emergency services call requesting follow-up by first responders to help others in distress.

There is a need for a system and method for amending implementation instructions for a call notification service or other Emergency Auxiliary Services whether those services are generated automatically from an emergency services request or upon follow-up by public safety or emergency personnel. Such a method and system will allow subscribers to proactively opt-in to or retroactively cancel or modify the Emergency Auxiliary Services.

SUMMARY OF THE INVENTION

A system for amending implementation instructions for any number or combination of Emergency Auxiliary Services, the Emergency Auxiliary Services being effected according to the implementation instructions regarding at least one predetermined receiver after a triggering communication is placed from a subscribing communication instrument includes: (a) A change ordering means for effecting the amending. The change ordering means is exercised by a service requester using the subscribing communication entity. The change ordering means is generally originated by the service requester (usually a subscriber) or on behalf of the service requester and is typically embodied in a change-ordering communication from the subscribing communication instrument. (b) An instruction amending means coupled with the subscribing communication entity. The instruction amending means responds to the change ordering means to effect the amending. The instruction amending means is generally embodied in an instruction-amending communication directed to a predetermined receiving entity that is in a position to effect the desired amendment in instructions relating to carrying out the previously ordered Emergency Auxiliary Services.

The apparatus of the present invention may be configured to communicate an instruction-amending communication in response to a change-ordering communication received from another entity than the service requester or the subscriber. This arrangement may be in place, by way of example and not by way of limitation, when Emergency Auxiliary Services (e.g., emergency medical assistance) is requested via an ACN (Automatic Crash Notification) device signaling a central call center that a vehicle has been involved in an accident. In this situation, the service requester may be the ACN device, the driver of the vehicle or the call center who places a call to a 9-1-1 number on behalf of the ACN service's client. An important aspect to note by this example is that the change-ordering communication does not necessarily originate from the service requester. The change-ordering communication may originate from an entity other than the service requester (e.g., the ACN call center or another entity) on behalf of the service requester. Alternatively, one may establish operating criteria or rules by which an entity other than the service requester may originate a change-ordering communication independent of the service requester to precipitate an instruction-amending communication.

The operating criteria may provide that a system or entity other than the system or entity that originated the request for Emergency Auxiliary Services may be employed to carry out and execute change-ordering communications and the resulting instruction-amending communication. An exemplary situation in which this arrangement may be beneficial is when a passerby lends a cellular phone to a service requester by which the service requester initiates a change-ordering communication.

It is, therefore, an object of the present invention to provide a system and method for amending implementation instructions for a call notification service or other Emergency Auxiliary Services whether those services are generated automatically or upon follow-up by public safety personnel.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

The present invention is a system and method for use in connection with a request for emergency services (e.g., fire, medical or police), either to initiate Emergency Auxiliary Services or to cancel, suppress or amend Emergency Auxiliary Services before the requested emergency services have been completed. The system and method may be used by an individual or business dialing a special number call or otherwise communicating to either opt-in to Emergency Auxiliary Services or cancel, suppress or amend such services before the services have been completed. Special number call should be understood to include any type of emergency services request, whether dialed using numeric digits or non-dialed using any number of telecommunication technologies that reach an emergency dispatch center or result in follow-up by emergency services personnel. The present invention may be used to either opt-in, cancel, amend or suppress any number of Emergency Auxiliary Services individually or in combination. The invention may also permit sending signal combinations to elect or suppress selected different services under different conditions.

For purposes of this disclosure, the term Emergency Auxiliary Services is considered to include any type, combination or logical extension of non-emergency services that may be rendered as a result of an emergency service request (e.g., a 9-1-1 call). Emergency Auxiliary Services include, by way of example and not by way of limitation, notification services systems (i.e., services that effect notification to predetermined callees when a request for emergency service is placed from a calling or communication instrument identified by a subscriber to such service), providing critical subscriber data (e.g., language preference, medical conditions or records, building and infrastructure layouts, photographs, locations of hazardous materials and similar information), concierge-type services and other types of services rendered in conjunction with an emergency services request.

Notification services will be described in greater detail to illustrate the invention, it being understood that the invention applies to other types of Emergency Auxiliary Services as well. Emergency call notification may be made to a pre-identified list of contacts that an emergency call has been made from a particular phone number, email address, IP address, individual or physical address or location. The notification may be made either by a call center or by an automated system such as an IVR (Interactive Voice Response) system.

The notification may be made to a wired phone, a wireless phone, VoIP (Voice over Internet Protocol) phone, facsimile, pager, e-mail address, Internet site, PDA (Personal Digital Assistant) or any other wireless or electronic communication device.

Emergency Auxiliary Services, including notification, may be initiated by any Emergency Auxiliary Services originating entity. Emergency Auxiliary Services originating entities include any network element, such as an ESME (Emergency Service Messaging Entity), involved in emergency services request processing that initiates Emergency Auxiliary Services in response to detecting selected types of emergency services requests or other pre-defined criteria. An ESME may be any system that provides ALI (Automatic Location Identification) data to a PSAP (Public Safety Answering Point) with or without data from additional sources. This ALI data should be understood to include location information that does not reside in a fixed database but may be determined at the time of the call for any type of emergency services request including wired, non-wired, and non-numeric devices. The term "non-wired" device is intended to include devices not wired to a telephone network, such as wireless phones, VoIP (Voice over Internet Protocol) or VoC (Voice over Cable) phones, PDAs (Personal Digital Assistants), PCs (Personal Computers), laptop computers, interactive TV system and other similar communication devices that may communicate wirelessly, via the Internet or via another means other than a telephone network.

A deployed asset is an asset that is made available for use for its intended purpose, as distinguished from when the asset is being developed or used in an experimental mode to confirm that it is ready to be used for its intended purpose. By way of example and not by way of limitation, a deployed asset may be an emergency service vehicle such as a fire engine, an ambulance, a police unit or a rescue unit that are available for service to the public, as distinguished from a prototype vehicle that is still being designed or tested by its manufacturer before production vehicles are delivered to customers for ongoing operation. A distributed asset environment or architecture divides functionality among various system elements. A deployed asset may be part of a distributed asset system. The invention may be used by a deployed asset in a distributed asset environment or architecture in which a broker may be situated between participants in an emergency service system and serves as the Emergency Auxiliary Services originating entity. For example, a broker may be situated between a PSAP and any number of Emergency Auxiliary Service Providers (EASPs) including an ALI provider. In such an arrangement, a broker may receive from a PSAP a token that acts as a key. Upon receiving a request for Emergency Auxiliary Services from a PSAP, a broker locates all EASPs that relate to the extant emergency event with which the token is associated. A key or token permits Emergency Auxiliary Services to be associated with a characteristic of the requesting party. One example of such a key or token is the telephone number (TN) of the requesting party who calls requesting Emergency Auxiliary Services. However, a key may also be associated with any type of identification of a location from which or communication device by which a service requesting entity contacts public safety authorities. Examples of such locations or communication devices that may be associated with keys include, by way of example and not by way of limitation, wired phone, wireless phone, VoIP (Voice over Internet Protocol) phone, PDA (Personal Digital Assistant), MAC (Media Access Control) Address, URL (Universal Resource Locator) Internet Address, WiFi (Wireless Local Area Network), WiMAX (wireless interoperability metropolitan area access), personal area network such as Blue Tooth or 802.15, wireless enabled laptop computer, interactive TV system or another location or communication device. Moreover, keys or tokens do not need to be restricted to being associated with locations or communication devices; keys may also be associated with a participant in an emergency event. Thus, a key may be a social security number of an individual person, an employee identification number, a driver's license number or a similar individual-identifying number or code. A key may involve one or more EASP in carrying out one or more implementation steps.

The broker involved in a distributed asset environment or architecture for using the present invention is a significant improvement over today's emergency service provider systems. In today's emergency service provider systems only limited information is available to a PSAP when an ALI node is queried. Today's ALI (Automatic Location Identification) facilities are embodied in a database that correlates a telephone number (TN) with a geographic location for the TN. When a call is received by a PSAP (Public Safety Answering Point), an ANI (Automatic Number Identification) code is presented along with the voice communication. The ANI code is associated with the communication device that is used to call the PSAP and is usually the calling device's 10-digit telephone number. One may recognize that the provision of an ANI code with an incoming call to a PSAP is similar to the now-familiar Caller ID service provided by telephone companies. Because the telephone service providers knew where they installed wired telephones, the telephone company's own records formed the basis for the ALI system, using the ANI as the basis for determining location of a particular phone used to call a PSAP.

With the introduction of non-wired phones, such as wireless phones, VoIP phones and other communication devices not wired to a telephone network, the location or identification of a caller or service requester is not so easily resolved as searching a telephone company's records using the caller's telephone number—as is accomplished using the ANI-ALI system of today. For example, determining the location of a wireless phone caller involves an ALI node querying another facility, such as an MPC (Mobile Positioning Center) to ascertain location of a wireless phone caller.

A broker function provides a robust structure to increase availability of Emergency Auxiliary Services in a system architecture in which each notification service, each location determining service and even each ALI database may be regarded and treated as an EASP (Emergency Auxiliary Service Provider). Using such a broker-involved system architecture, an unlimited number of EASPs may be available to a PSAP by the PSAP simply querying a broker using a token or key associated with the extant emergency event. Each respective EASP will have pre-registered with the broker a list of tokens or keys for which the respective EASP can provide Emergency Auxiliary Service, such as notification service, provision of supplemental data to the PSAP usable by the PSAP or by first responders, or another service.

The token or key is used in the system architecture to determine which respective EASPs have data or services relevant to an extant emergency event; the token or key is preferably associated with a participant, a location or a communication device used to request emergency service. That is, a token or key used with such a distributed asset architecture system is assigned before an emergency event occurs and is usually associated with an individual or a device. Other bases for establishing tokens or keys may also be developed. There can be several tokens or keys associated with a single respective emergency event. A respective token or key may be associated with more than one event, as in the situation where a Good Samaritan caller (identified with an associated token) calls for emergency services on witnessing an automobile accident (first event) and thereafter witnesses a house fire (second event).

Thus, a respective EASP may be designated by a PSAP to provide a service in response to a PSAP query that uses an ANI to obtain location information from an ALI node. In today's architecture, an ANI-ALI query is made directly by a PSAP to an ALI node (using an ANI). In a distributed asset environment or architecture, a PSAP may make such a query to an intermediary that provides a broker function for a plurality of EASPs. An ALI node may be just one of the EASPs associated with a broker.

Network elements may be configured for detecting predetermined message-types, such as emergency service request calls (e.g., a 9-1-1 call). Such configured network elements may be designed to initiate a request for Emergency Auxiliary Services when such a predetermined message-type or other criteria is detected. A network element so configured may operate as an Emergency Auxiliary Services originating entity within the scope of the present invention. Such other Emergency Auxiliary Services originating entities include but are not limited to a tandem switch (either a selective router or a carrier switch), a MSC (mobile switching center), a MPC (Mobile Positioning Center), a PDE (Positioning Determination Equipment), a SCP (Service Control Point), a HLR (Home Location Register), a SIP (Session Initiation Protocol) proxy server, or a server using H.323 protocol. Emergency Auxiliary Services originating entities may also include elements or components of Central Station Alarm or Personal Emergency Response systems. Emergency Auxiliary Services originating entities may include not only network elements such as those mentioned above but also any network or link monitoring system set up for sensing, sniffing, or monitoring of communication signals into, out of or through any other network element.

Emergency Auxiliary Services originating entities may also include equipment operated by public services personnel such as PSAP and emergency first responders (e.g., EMS (Emergency Medical Service), fire, police, and other emergency service personnel). Such public services operated equipment may also include CPE (Customer Premises Equipment) and CAD (Computer Aided Dispatch). Such public services operated equipment may further include auxiliary database systems co-located with any Emergency Auxiliary Services originating entity or wirelessly connected smart systems located in ambulance, police, or fire vehicles.

For purposes of this disclosure, the term service requester shall be understood to apply to any type of communication device or instrument, an individual, a company, a system, or a provider of Emergency Auxiliary Services. That is to say a service provider who may have a billing relationship with a subscriber, company, or systems, may request delivery of individual or a combination of Emergency Auxiliary Services from another end provider.

Also for purposes of this disclosure, the term Emergency Auxiliary Services is considered to also include any combination or logical extension of systems that provide supplemental emergency data to PSAPs, emergency first responders, hospitals, government entities (e.g., the department of homeland security, military personnel, or poison control centers), or other authorized recipients during or following an emergency service request communication. Supplemental emergency data may include, by way of example and not by way of limitation, subscriber supplied medical or household data such as allergies, medical conditions, blood type, medications, handicaps, bedroom locations, dangerous dog, bars on windows, gated community, number of children, driving directions or other information that may be useful for emergency first responders in rendering emergency assistance. Supplemental emergency data may also include medical records supplied by medical providers, employer records, and insurance records. Other examples of supplemental emergency data may include hazardous materials lists or locations, building layouts or photos for residential addresses, campuses or business or industrial buildings, plumbing or electrical infrastructure diagrams (for example, to assist first responders in finding a shut off valve). Still other examples of supplemental emergency data may include photos or descriptions for missing persons, including children. Supplemental emergency data may still further include government emergency data provided to the public or to other interested parties, businesses or agencies that may not receive notification using standard wired phones listed in ALI databases or in publicly available phone directories (e.g., yellow pages or Qwestdex™). Supplemental emergency data information can be delivered to subscriber or business specified communication devices (wired or non-wired), including VOIP phones, email addresses, wired phones outside of areas affected by an emergency or disaster. Supplemental emergency data information can include public safety warnings or orders associated with natural disasters (e.g., fire, flood, hurricane), criminal or terrorism activities, and evacuation or "all clear" orders. Supplemental emergency data information can be emergency data tracked by various government agencies, such as the status of natural disaster, criminal or terrorism related activities, or the number of 9-1-1 calls within a given area or time.

Emergency Auxiliary Services may also involve providing information relating to emergency location, such as the location of a non-wired caller. Emergency Auxiliary Services may, for example, provide notification services or provide services based on a non-wired caller's location during or following an emergency call. The caller's location may have been provided to a PSAP during an emergency call or it may have been determined for a non-regulated service such as a VoIP phone. The caller's location may also have been determined for a non-voice emergency request such as from a PDA, a home or business computer or an interactive TV system. The caller's location may be determined by any of a number of technologies including location of nearest cell tower serving a call, GPS (Global Positioning Satellite), intelligent network combination of multiple signals, PBX (Private Branch exchange), ERL (Emergency Routing Location), LIS (Location Information Server), SIP (Session Initiation Protocol) proxy server or connected technology or other locating technologies and methods. The caller's location can be provided to a PSAP either through an ESME or directly through an alternate router or a stand-alone ALI system. Additionally, the caller's location can be provided to a PSAP by any of a number of other technologies including network push or query or public or private internet technologies.

Emergency Auxiliary Services may also include follow-up information or services based on a caller's location at the time of an emergency call. For example, if a subscriber who lives in Denver calls 9-1-1 while visiting Memphis, then an Emergency Auxiliary Services system could include providing the phone number of local hospitals to emergency contact notification callees. In the alternative, an Emergency Auxiliary Services system or personnel delivering such services could directly contact local hospitals to try to locate the subscriber and then notify the contactees (callees).

Emergency Auxiliary Services may also include personal concierge services by which "concierge-like" personal services may be performed on behalf of a subscriber who has a sudden change of plans because of being involved in an emergency event. Personal concierge services can include, by way of example and not by way of limitation, transportation services such as picking up a child from daycare or school or transporting a child to an alternate care provider. Personal concierge services may include arranging or canceling appointments, such as an auto repair or a doctor's appointment, or letting in a pet or repair person.

Using the system and method of the present invention, an individual or business calling 9-1-1 or making another type of emergency services request could either opt-in or cancel or suppress Emergency Auxiliary Services by using any of a number of notification means or instruction amending means. Each telecommunication service provider may provide different pre-identified options for the caller to use to proactively opt-in, cancel, suppress or amend instructions for Emergency Auxiliary Services. These methods or systems may be determined by the type of communications instrument, the type of telecommunications services, or the Emergency Auxiliary Services provider, perhaps based on the capability of the systems or instruments involved. It should be understood that some technologies used to effect the instruction amending means may also allow sending different signal combinations to enable or suppress selected different services or combinations of services under different conditions.

In one embodiment, by way of example and not by way of limitation, telephone switch functionality can be altered to allow a subscriber to opt-in or cancel or suppress Emergency Auxiliary Services for an emergency call. By way of example and not by way of limitation, the switch or equivalent technology serving the emergency number call (either a wired switch or wireless network MSC (Mobile Switching Center)) may be pre-programmed to recognize a notification means or instruction amending means embodied in an altered special numbering sequence such as "9-1-1-#" or "9-1-1-*-*". In this example, a telecommunication switch could identify the altered special number digits and change how the call is processed. For example, if an MSC were programmed to identify "9-1-1-*-*" or another triggering sequence, that special numbering sequence call could be first routed to an SCP (Service Control Point), and the SCP can identify that the additional digits "-*-*" indicate that the caller had placed a "Good Samaritan" call and did not want to invoke Emergency Auxiliary Services. In response, the SCP could initiate the follow-on 9-1-1 call and then return control of the call to the switch. In another example, an SIP (Session Initiation Protocol) proxy server may be used to identify a caller's preference to opt-in or cancel or suppress Emergency Auxiliary Services for a VoIP (Voice over Internet Protocol) initiated emergency call based using an altered dialing or key-pad sequence.

A telecommunication switch could also be programmed to recognize "*-X-X" (where "X-X" represents a pre-identified feature code of any length and type of digits) dialed after an emergency call to indicate the caller's desire to opt-in or suppress Emergency Auxiliary Services for that emergency call using DTMF (dual tone multiple frequency) or other technologies to identify the implementation instruction code, "X-X", and send the appropriate instruction to an Emergency Auxiliary Services provider.

Another exemplary embodiment of a notification means or an instruction amending means is a caller dialing an additional number sequence using either a feature request code or IN (Intelligent Network) technologies. Technologies such as ANSI (American National Standards Institute) Standard ANSI41, WIN (Wireless Intelligent Network) or AIN (Advanced Intelligent Network) may be used in conjunction with an IVR (Interactive Voice Response) system to listen for tones identifying the feature code to opt-in or suppress Emergency Auxiliary Services and send a message to an HLR (Home Location Register) or to a SCP (Service Control Point).

For example, after completing a 9-1-1 call, a caller using a wireless device may dial "*-X-X" (where "X-X" represents a pre-identified feature code of any length and type of digits). An ANSI 41 Network could then send a feature request message with the X-X feature code from the MSC to an HLR (Home Location Register). Based on the feature code, the HLR could determine whether the caller prefers to opt-in or cancel or suppress Emergency Auxiliary Services. Each telecommunication service provider could decide to implement their respective feature codes differently, and could decide individually whether to initiate differentiated Emergency Auxiliary Services based on call origination preferences, based on call termination preferences or based on the caller's location at the time of the 9-1-1 call. The X-X feature code may be configured to permit a caller to pick and choose which of several services are not desired among the Emergency Auxiliary Services provided.

Alternately, after completing a 9-1-1 call, a caller using a wireless device may dial "*-X-X" (where "X-X" represents a pre-identified feature code of any length and type of digits) and either opt-in or suppress or cancel Emergency Auxiliary Services through an IN (Intelligent Network) technology such as WIN (Wireless Intelligent Network) or AIN (Advanced Intelligent Network). Through the wireless caller's provider (i.e., the telecommunication service provider handling the call), Emergency Auxiliary Service triggers may be added to a subscriber's HLR profile. When a wireless subscriber registers with the supporting switch (as by turning on their phone or driving into a cell site served by that switch), the HLR profile, including the added Emergency Auxiliary Service triggers, is downloaded to the supporting switch. The Emergency Auxiliary Service triggers are "armed" so that if certain digits are dialed, for example "*-X-X", then the switch passes control over to an SCP (Service Control Point). Based on the "X-X" code, the SCP would determine whether to opt-in or suppress various Emergency Auxiliary Services. The X-X feature code may be configured to permit a caller to alter combinations of selected services among the Emergency Auxiliary Services provided, or for example to select different notification lists.

Equipment or personnel at a PSAP (Public Safety Answering Point) can also be employed to determine whether to opt-in or suppress or cancel Emergency Auxiliary Services for an emergency call. Emergency Auxiliary Services include, by way of example and not by way of limitation, notification services systems (i.e., services that effect notification to predetermined callees when a request for emergency service is placed from a calling or communication instrument identified by a subscriber to such service), providing critical subscriber data (e.g., language preference, medical conditions or records, building and infrastructure layouts, photographs, locations of hazardous materials and similar information), concierge-type services and other types of services rendered in conjunction with an emergency services request. With the widespread use of pre-programmed 1-digit dialing (e.g., if one dials "9" on a wireless phone, that phone may be pre-programmed to dial 9-1-1), there is an increasing rate of unintended 9-1-1 calls. In response, PSAP equipment or personnel may determine that Emergency Auxiliary Services should not be initiated if there is a "hang-up" or "no voice response" for a 9-1-1 call. Alternately, Emergency Auxiliary Services could be either initiated or cancelled or suppressed based on the call disposition. For example, certain services may be automatically or manually initiated if a 9-1-1 call results in a medical dispatch, other services may be initiated if the 9-1-1 call results in a police dispatch, and all services may be suppressed if their was no dispatch, as may occur in connection with a 9-1-1 call reporting an auto-accident in which the caller himself was not involved (an example of a "Good Samaritan" call).

In another embodiment, the logic for deciding when to initiate or opt-in or suppress services could be pre-programmed into a CAD (Computer Aided Dispatch) system or another system located at a PSAP. In still another embodiment, PSAP personnel could manually indicate what Emergency Auxiliary Services to invoke through a computer or hand-held device connected to an Emergency Auxiliary Services provider via any of a number of communication systems, including wireless technologies, public internet or private dedicated network. These communication systems may accommodate routing from diverse communication technologies including conventional telecommunications switching and routers from POTS (Plain Old Telephone Service) phones or wireless phones and using IP (Internet Protocol) based technologies from VoIP phones, PDA devices or even computers themselves. Finally, these communication systems may not be located at a PSAP at all, but may instead be operated by a first responder either in their vehicle or at a remote command location.

In another embodiment, participants in an emergency service system, such as PSAP personnel, can opt-in or cancel requests for Emergency Auxiliary Services using any type of ESME system, including today's ALI architecture or those described in Antonucci, Menard, or in the distributed asset environment or architecture described earlier. In a distributed asset environment or architecture, if a token used to terminate, cancel or amend Emergency Auxiliary Services accompanies the original token that is associated with the initial call that triggers an emergency response, then the present invention will work properly in the distributed asset architecture using a broker. In this embodiment, one class of tokens may be associated with a participant or location of communication device used to request emergency service, and another class may be used to alter or amend the Emergency Auxiliary Services based on the type or severity of emergency, or based on the expressed preferences of the emergency participant, e.g. the caller. In such cases, the PSAP or emergency services system may receive the caller's preferences either verbally or via non-verbal communication or altered dialing sequence, and then send in sequential tokens, the first associated with the participant or device and the second to amend the types of Emergency Auxiliary Services requested. Alternatively, multiple tokens may also be associated with a single individual or a device, where different tokens are used to differentially opt-in or cancel Emergency Auxiliary Services based on the type or severity of emergency services requested.

A telematic device (e.g., OnStar™) may also be used to opt-in or cancel or suppress Emergency Auxiliary Services. The telematic device could be pre-programmed to determine what services to invoke. For example, selected services could be initiated based on the severity of an accident. Alternately, a telematic device user could manually opt-in or cancel or suppress Emergency Auxiliary Services. For example, if a telematic device initiates a call to a telematic service provider's call center, then the driver could verbally indicate their Emergency Auxiliary Services preferences and the call center personnel could interface with an Emergency Auxiliary Services system or a third party provider to convey the driver's preferences.

PERS (Personal Emergency Response Systems) or Central Station Alarm systems may also be enhanced to allow subscribers to differentially send in emergency request signals to opt-in or cancel Emergency Auxiliary Services. For example, a PERS unit, e.g. a pendant or medallion, could have one button to initiate an emergency request with Auxiliary Services and a second button to initiate an emergency request without Auxiliary Services. Such a PERS unit could optionally include a third button to cancel an emergency services request initiated by either of the first and second buttons. Alternatively, subscribers to PERS services could have previously indicated for which emergency conditions they wish certain Emergency Auxiliary Services to be triggered, and then personnel at the PERS service center could initiate desired services following an emergency services request from a subscriber based on the nature of the emergency. Similarly, Central Station Alarm systems could be programmed to trigger certain Emergency Auxiliary Services such as notifications for a certain level of alarming or triggering specific sensors. Such systems could also allow subscribers to access the Central Station Alarm System automatically using pre-assigned codes or via a call center to opt-in or suppress different Emergency Auxiliary Services.

A subscriber to Emergency Auxiliary Services may also use semi-automated or manual methods to opt-in or suppress or cancel one or more previously invoked or designated Emergency Auxiliary Services. For example, following a 9-1-1 call, the caller could directly dial an Emergency Auxiliary Services provider to communicate their desire to opt-in or suppress or alter services. The caller's desire can be automatically identified using an ANI (Automatic Number Identification) system or IVR (Interactive Voice Response) system where the caller may be prompted to enter their TN (Telephone Number) or an account number using a touch-tone pad or an ASR (Automatic Speech Recognition) device could allow the caller to verbally speak their preference. Alternatively, the caller may speak with a call center agent who then interfaces with the notification or other Emergency Auxiliary Services system.

In another embodiment, following a 9-1-1 call a caller may access the web (e.g., World Wide Web using the Internet, or an equivalent public network) and communicate with an Emergency Auxiliary Services provider via any of a number of technologies. These include technologies available for wireless devices, such as WAP (Wireless Application Protocol) or MMS (Multimedia Messaging Service). The caller may access the web using a standard Microsoft Windows or Netscape browser using a PDA or a computer.

In yet another embodiment, following a 9-1-1 call, a SMS (Short Message Service) or an EMS (Enhanced Message Service) message may be sent to a wireless device to prompt a caller to opt-in or suppress Emergency Auxiliary Services. If the message service is two-way enabled, the caller could indicate via a pre-programmed symbol or dialing sequence a desire to opt-in or cancel or suppress Emergency Auxiliary Services. For standard SMS services widely available today, an Emergency Auxiliary Services system could send a phone number for the caller to call to indicate their desire to opt-in or cancel or suppress the services.

Figure 1:
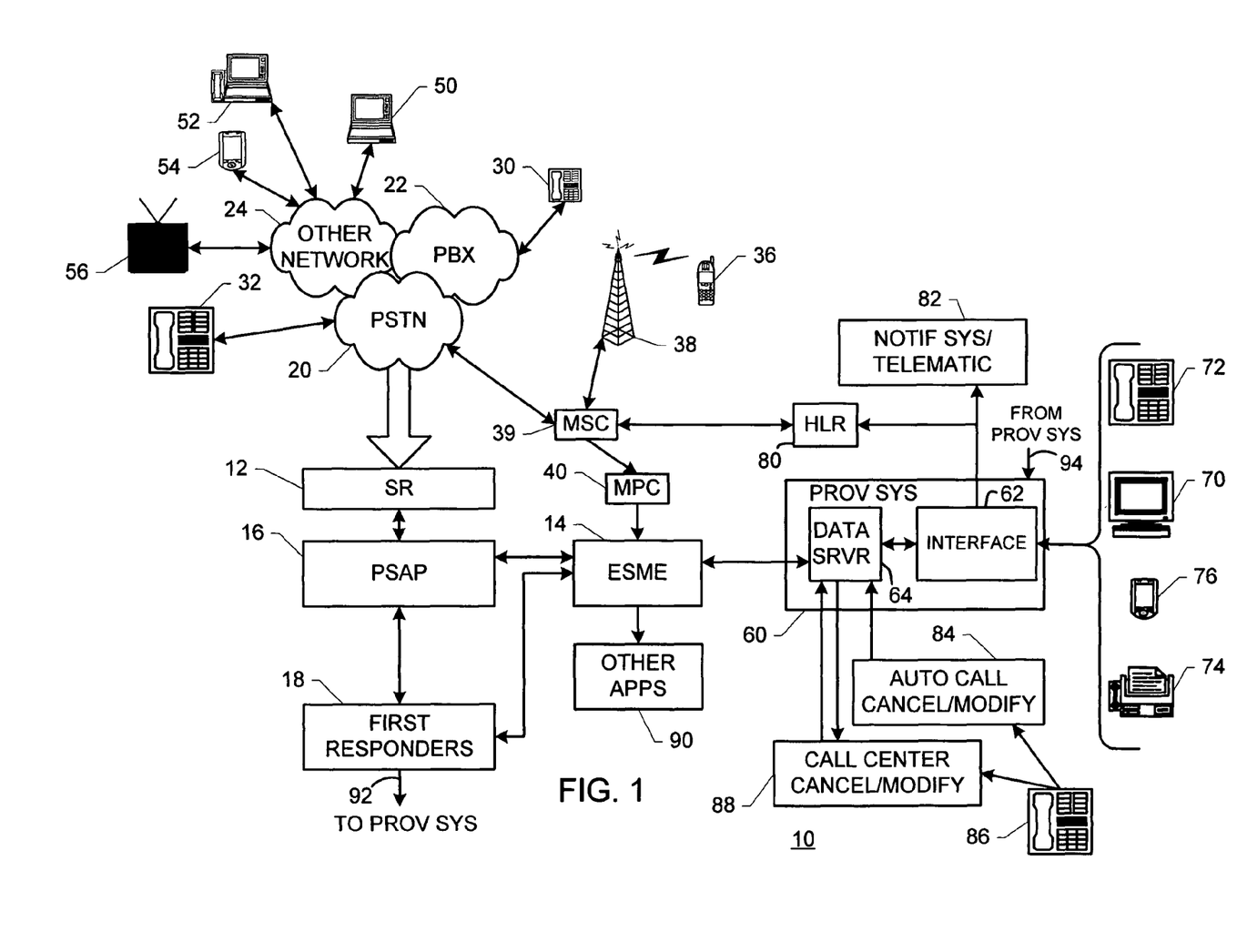
FIG. 1 is a schematic diagram illustrating the apparatus of the present invention.

FIG. 1 is a schematic diagram illustrating the apparatus of the present invention. In FIG. 1, a generic representation of a special number call system is illustrated by an emergency services call system 10. System 10 includes an SR (Selective Router) tandem switch 12 coupled with an ESME (Emergency Services Messaging Entity) 14 via a PSAP (Public Safety Answering Point) 16 SR tandem switch 12 may also be directly coupled with ESME 14, as in the case where the SR tandem switch 12 directly queries ESME 14 for routing instructions for either a wireline or wireless emergency services request (not shown in FIG. 1). ESME 14 includes an ALI (Automatic Location Information) system and associated network elements, control elements and Supplemental ALI information that is generally maintained in emergency service call systems databases. PSAP 16 is communicatingly coupled with selective router 12 and ESME 14. PSAP 16 also is coupled for communicating with first responders 18 (e.g., emergency medical, police and fire facilities; not shown in detail in FIG. 1). Selected first responders 18 may be coupled for communication with ESME 14.

9-1-1 emergency calls are received by selective router 12 from any of a variety of networks including, by way of example and not by way of limitation, a PSTN (Public Switched Telephone Network) 20, a PBX (Private Branch eXchange) network 22, other networks 24 (e.g., an Internet Protocol network), or a combination of networks 20, 22, 24. Thus, a caller or service requester from a phone 30 associated with private branch exchange 22 may place a 9-1-1 call that will be routed via PBX network 22 and PSTN 20 to selective router tandem 12. Similarly, a caller from a phone 32 may place a 9-1-1 call via PSTN 20 to selective router tandem 12. A caller or service requester may use other communication devices such as a personal computer (PC) 50, a VoIP (Voice over Internet Protocol) phone 52, a PDA (Personal Digital Assistant) 54 or an interactive TV system 56 to place an emergency services request (e.g. a 9-1-1 call) using voice, a key pad or SMS (Short Messaging System) or another message format via one or more of other networks 24 (e.g., an Internet Protocol network or other public network or a private network) and PSTN 20 to reach selective router tandem 12. A mobile phone 36 may be used to place a 9-1-1 call via a mobile tower 38, an MSC (Mobile Switching Center) 39 and PSTN 20 to selective router tandem 12. MSC 39 is coupled with a MPC (Mobile Positioning Center) 40. MPC 40 and ESME 14 cooperate both to route the 9-1-1 call to PSAP 16 and to provide position information relating to wireless or mobile phone 36 for use by PSAP 16 in selecting which first responders 18 to dispatch to aid the caller using mobile phone 36. Mobile phone 36 may also place a 9-1-1 call using a WiFi (Wireless Local Area Network) network, where mobile phone 36 uses a modem or a RF (radio frequency) hot spot (not shown in FIG. 1) coupled with an IP network, represented by other network 24, then connected to MSC 39 and routed to the PSAP 16 via the PSTN 20 and selective router tandem 12. A RF hot spot provides localized wireless coverage using any number of technologies.

In the representative embodiment illustrated in FIG. 1, ESME 14 is also coupled with a provisioning system 60. Provisioning system 60 includes an interface 62 and a data server 64. Data server 64 represents one or more data storage unit or units and an associated server for accessing that data storage unit or units. Data server 64 may be embodied in any server and associated data storage unit (or units) configured to permit remote access to data stored in data server 64 and alteration of data stored in data server 64. Information required for establishing and defining personal services to be provided by an Emergency Auxiliary Services system (e.g., emergency notification system, supplemental emergency data system, personal concierge system or another system) is provided to interface 62 of provisioning system 60 by subscribers.

A subscriber of an Emergency Auxiliary Services system may use any one of several methods for submitting their personal information to interface 62 for inclusion in data server 64 such as, by way of example and not by way of limitation: via a computer 70 to send an e-mail via the Internet; calling a personal 9-1-1 representative using a phone 72; calling an IVR (Interactive Voice Response) system (not shown in FIG. 1) using a phone 72 to connect with data server 64 to effect the desired subscription or changes. Other methods for submitting or changing personal information stored in data server 64 include mailing in a personal information form via the postal service; using computer 70 to enter information to a web site provided for receiving updates to data server 64; submitting information via a facsimile machine 74; submitting information via a VoIP (Voice Over IP) connection (not shown in FIG. 1); submitting information using a PDA (Personal Digital Assistant) 76 or similar wireless device or by another communication method.

For those submission methods not involving a human operator, a subscriber submits personal information using a respective submission method and a personal 9-1-1 application program (preferably located in interface 62), receives the update, validates the sender and sends the update to data server 64 to apply the data stored in a database associated with data server 64 or to integrate the information directly with an ALI database (not shown in FIG. 1) within ESME 14. Methods that involve a human operator may operate similarly except that instead of the subscriber submitting personal 9-1-1 data directly to data server 64, a human operator enters the information to data server 64 on the subscriber's behalf either directly from a phone call or after receipt of the information via an electronic submission method such as e-mail, entry of information into a web site, facsimile (FAX), or another method.

Provisioning system 60 may be coupled with an HLR (Home Location Register) 80 associated with the wireless communication system using tower 38. Preferably HLR 80 is coupled with interface 62. A telematic system 82 is coupled with interface 62. A telematic system is a wireless communication system (e.g., an OnStar™ system) by which subscribers may alert a centrally located call center of difficulties, including being locked out of their car, being lost, or requiring towing or other assistance. A telematic system may also include sensors in subscribers' cars to alert the call center that the car has come to a sudden stop as in the case of a collision, or provide other sensor-indicated trouble calls. MSC 39 is coupled with HLR 80. Provisioning system 60 is coupled with an automatic call facility 84 for effecting automated cancellation or modification of aspects of instructions or other data stored by data server 64 in response to calls placed by a caller using a phone 86. Provisioning system 60 is also coupled with a call center 88 for responding to human intervention to cancel or modify of aspects of instructions or other data stored by data server 64. The human intervention provided from call center 88 is occasioned by instructions issued by a caller using phone 86. A subscribing caller may also access automatic call facility 84 and call center 88 using any of the various other communication instruments and systems used to access provisioning system 60 including a computer, a phone, a facsimile machine, a VoIP (Voice Over IP) connection, a PDA (Personal Digital Assistant) or similar wireless device or by another communication method (not shown in FIG. 1).

In an exemplary situation, a caller may place an emergency service request call (e.g., a 9-1-1 call) from any of phone 30, phone 32, PC 50, VoIP phone 52, PDA 54 or other communication device within a predetermined time following placement of a "Good Samaritan" emergency service call. A telephone switch in one of the networks, 20, 22, 24 (preferably in PSTN 20) that is programmed to recognize a notification means or instruction amending means embodied in an altered special numbering sequence such as "9-1-1-#" or "9-1-1-*-*" can change how the call is processed. For example, if MSC 39 is programmed to identify "9-1-1-*-*", that special numbering sequence call could be first routed to an SCP (Service Control Point) (not shown in detail in FIG. 1). The SCP would identify that the additional digits "-*-*" indicate that the caller had placed a "Good Samaritan" call and did not want to invoke Emergency Auxiliary Services. In response, the SCP could initiate the 9-1-1 call and then return control of the call to the switch. In another example, an SIP (Session Initiation Protocol) proxy server in an Internet Protocol network (e.g., network 24) may be used to identify a caller's preference to opt-in or cancel or suppress Emergency Auxiliary Services for a VoIP (Voice over Internet Protocol) initiated emergency call based using an altered dialing sequence. Alternatively, a VoIP phone may be coupled for routing communications directly to PSAP 16, bypassing PSTN 20 and Selective Router 12 (not shown in FIG. 1).

Another exemplary embodiment of a notification means or an instruction amending means is a caller dialing an additional number sequence using either a feature request code or IN (Intelligent Network) technologies. Technologies such as ANSI (American National Standards Institute) Standard ANSI41, WIN (Wireless Intelligent Network) or AIN (Advanced Intelligent Network) may be used in conjunction with an IVR (Interactive Voice Response) system installed in MSC 39 to listen for tones identifying the feature code to opt-in or suppress Emergency Auxiliary Services and send a message to HLR 80 or to an SCP (Service Control Point) in PSTN 20. For example, after completing a 9-1-1 call, a caller using wireless phone 36 may dial "*-X-X" (where "X-X" represents a pre-identified feature code of any length and type of digits). An ANSI 41 Network would then send a feature request message with the X-X feature code from MSC 39 to HLR 80. Based on the feature code, HLR 80 would determine whether the caller prefers to opt-in or cancel or suppress Emergency Auxiliary Services. The X-X feature code may be configured to permit a caller to pick and choose which of several services are not desired among the Emergency Auxiliary Services provided. The X-X feature code may be configured to permit a caller to alter terms of selected services among the Emergency Auxiliary Services provided, such as by amending the contact address or number information for contactees or receivers to be notified. IN technology may also be employed in wired networks to employ tones identifying a feature code to selectively opt-in or suppress Emergency Auxiliary Services.

Alternately, after completing a 9-1-1 call, a caller using wireless or mobile phone 36 may dial "*-X-X" (where "X-X" represents a pre-identified feature code of any length and type of digits) and either opt-in or suppress or cancel 911 Plus services through an IN (Intelligent Network) technology such as WIN (Wireless Intelligent Network) or AIN (Advanced Intelligent Network). Through the wireless caller's provider (i.e., the telecommunication service provider handling the call), Emergency Auxiliary Service triggers may be added to a subscriber's HLR profile in HLR 80. Each telecommunication service provider may provide different pre-identified options for the caller to use to proactively opt-in, cancel, suppress or amend instructions for Emergency Auxiliary Services. These methods or systems may be determined by the type of communications instrument, the type of telecommunications services, or the Emergency Auxiliary Services provider, perhaps based on the capability of the systems or instruments involved When a wireless subscriber registers with the supporting switch (as by turning on their phone or driving into a cell site served by that switch), the HLR profile in HLR 80, including the added Emergency Auxiliary Service triggers, is downloaded to the supporting switch. The Emergency Auxiliary Service triggers are "armed" so that if certain digits are dialed, for example "*-X-X", then the switch passes control over to an SCP (Service Control Point) in PSTN 20. Based on the "X-X" code, the SCP would determine whether to opt-in or suppress various Emergency Auxiliary Services. The X-X feature code may be configured to permit a caller to alter terms of selected services among the Emergency Auxiliary Services provided, such as by amending the contact address or number information for contactees to be notified.

Equipment or personnel at PSAP 16 can also be employed to determine whether to opt-in or suppress or cancel Emergency Auxiliary Services for an emergency call. With the widespread use of pre-programmed 1-digit dialing (e.g., if one dials "9" on a wireless phone, that phone may be pre-programmed to dial 9-1-1), equipment or personnel at PSAP 16 may determine that Emergency Auxiliary Services should not be initiated if there is a "hang-up" or "no voice response" for a 9-1-1 call. Alternately, Public Safety Services could be either initiated or cancelled or suppressed based on the call disposition. For example, certain services may be automatically or manually initiated if a 9-1-1 call results in a medical dispatch by PSAP 16, other services may be initiated if the 9-1-1 call results in a police dispatch by PSAP 16, and all services may be suppressed if their was no dispatch by PSAP 16, as may occur in connection with a 9-1-1 call reporting an auto-accident in which the caller himself was not involved (an example of a "Good Samaritan" call). To support these capabilities by PSAP 16, a direct connection between PSAP 16 and provisioning system 60 may be provided (not shown in FIG. 1).

In another embodiment the logic for deciding when to initiate or opt-in or suppress services could be pre-programmed into a CAD (Computer Aided Dispatch; not shown in detail in FIG. 1) system or another system located at PSAP 16. In still another embodiment, personnel at PSAP 16 could manually indicate what Emergency Auxiliary Services to invoke through a computer or hand-held device connected to provisioning system 60 via any of a number of communication systems, including wireless technologies, public internet or private dedicated network.

Communication with provisioning system 60 may not be located at PSAP 16 but may instead be established by a first responder 18 either in their vehicle or at a remote command location. This direct connection between a first responder 18 and provisioning system 60 may be established between a first responder 18 and data server 64 or between a first responder 18 and interface 62, as indicated by arrows 92, 94.

Telematic system 82 may be used to opt-in or cancel or suppress Emergency Auxiliary Services. Telematic system 82 may be pre-programmed to determine what services to invoke. For example, selected services could be initiated based on the severity of an accident; severity may be indicated by sensors installed in a subscriber's car. Telematic system 82 could employ a human call taker to manually opt-in or cancel or suppress Emergency Auxiliary Services in response to a voice or data indication received from a subscriber's car. For example, if a telematic device in a subscriber's car (not shown in FIG. 1) initiates a call to a telematic system 82, then the subscriber could verbally indicate his Emergency Auxiliary Services preferences and personnel at telematic system 82 call center would interface with data server 64 or with another human operator having access to data server 64 to convey the subscriber's preferences.

A subscriber to Emergency Auxiliary Services may also use semi-automated or manual methods to opt-in or suppress or cancel one or more previously invoked or designated Emergency Auxiliary Services. For example, following a 9-1-1 call, the caller could directly dial call center 88 to talk with a human operator to communicate the caller's desire to opt-in or suppress services. The caller may dial automatic call facility 84 so that the caller's desire can be automatically identified using an ANI (Automatic Number Identification) system or IVR (Interactive Voice Response) system where the caller is prompted to enter their TN (Telephone Number) or an account number using a touch-tone pad.

In another embodiment, following a 9-1-1 call a caller may access the web (e.g., World Wide Web using the Internet, or an equivalent public network) and communicate with an Emergency Auxiliary Services provider via any of a number of technologies available for wireless devices, including WAP (Wireless Application Protocol) or MMS (Multimedia Messaging Service). The caller may access the web using a standard Microsoft Windows or Netscape browser using PC 52 or PDA 54.

In yet another embodiment, following a 9-1-1 call an SMS (Short Message Service) or an EMS (Enhanced Message Service) message may be sent to a wireless device such as mobile or wireless phone 36 or PDA 54 to prompt a caller to opt-in or suppress the Emergency Auxiliary Services. If the message service is two-way enabled, the caller could indicate via a pre-programmed dialing sequence or a spoken command processed by a voice recognition system a desire to opt-in or cancel or suppress Emergency Auxiliary Services. For standard SMS services widely available today, an Emergency Auxiliary Services system could send a phone number for the caller to call to indicate their desire to opt-in or cancel or suppress the services using any of phone 30, phone 32, mobile phone 36, PC 50, VoIP phone 52, PDA 54 or another communication device.

In the event that notification criteria or parameters for Emergency Auxiliary Services are altered or cancelled by use of the present invention, ESME 14 preferably provides notice to other systems and applications 90 that such changes have been ordered, and may advise other applications 90 of what the changes are.

Figure 2:
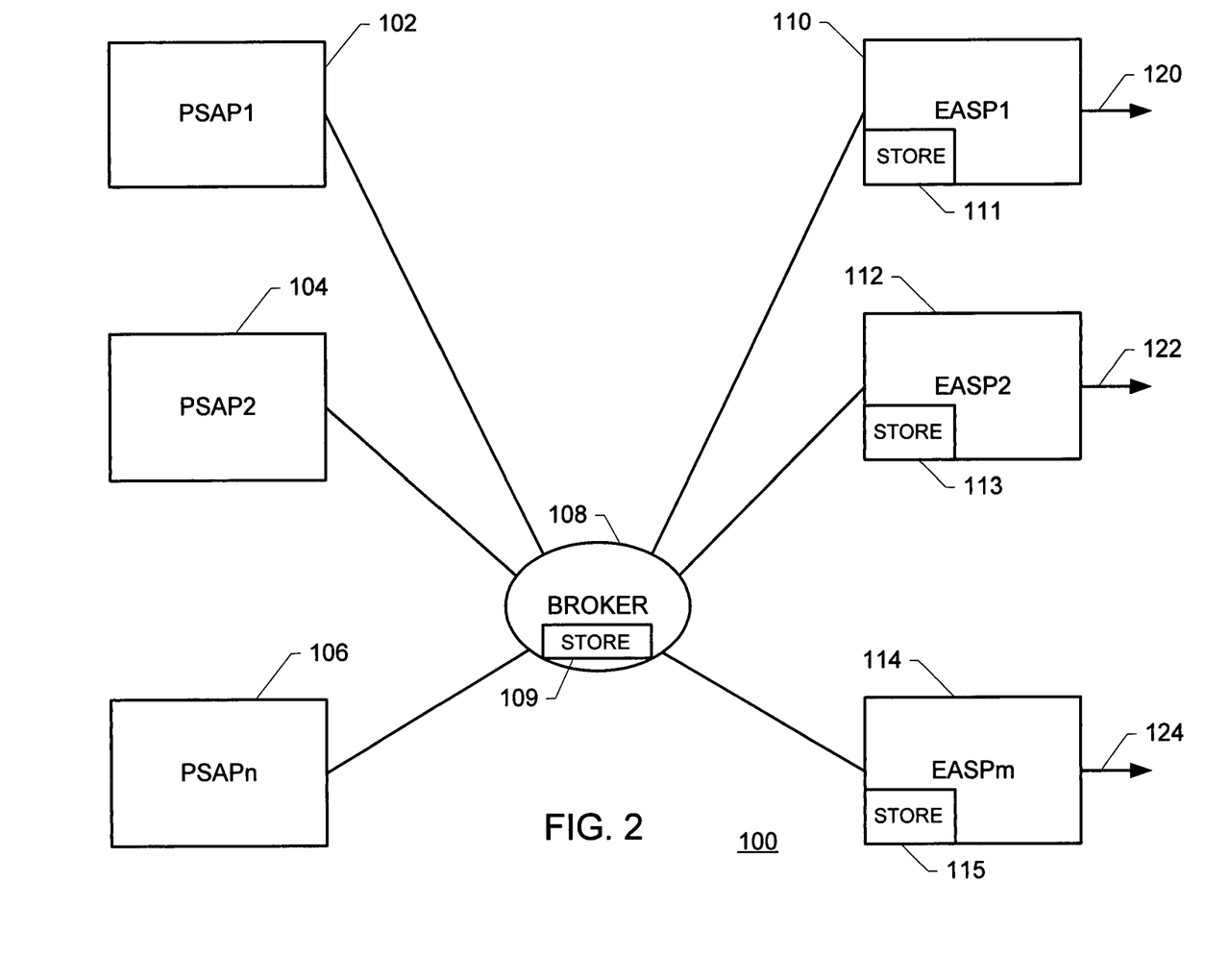
FIG. 2 is a schematic diagram illustrating a representative configuration for employing the present invention in a distributed asset environment.

FIG. 2 is a schematic diagram illustrating a representative configuration for employing the present invention in a distributed asset environment or architecture. In FIG. 2, an emergency service system 100 is configured in a distributed asset architecture. In a distributed asset architecture, functionality is divided among various system components. Emergency service system 100 includes at least one PSAP (Public Safety Answering Position) represented by a PSAP 102 (PSAP1), a PSAP 104 (PSAP2) and a PSAP 106 (PSAPn). The indicator "n" is employed to signify that there can be any number of PSAPs in emergency service system 100. The inclusion of three PSAPs 102, 104, 106 in FIG. 2 is illustrative only and does not constitute any limitation regarding the number of PSAPs that may be included in the emergency service system of the present invention.

Each of PSAP 102, 104, 106 is in communication with a broker or intermediary 108. Broker 108 is in communication with at least one EASP (Emergency Auxiliary Service Provider) or Emergency Auxiliary Service Providing Entity represented by an ESAP 110 (EASP1), an EASP 112 (EASP2) and an EASP 114 (EASPm). The indicator "m" is employed to signify that there can be any number of EASPs in emergency service system 100. The inclusion of three EASPs 110, 112, 114 in FIG. 2 is illustrative only and does not constitute any limitation regarding the number of EASPs that may be included in the emergency service system of the present invention.

Emergency service system 100 is a distributed asset system in which broker 108 is situated between participants in an emergency service system, namely PSAPs 102, 104, 106 and EASPs 110, 112, 114. Broker receives, by way of example and not by way of limitation, from PSAP 102 a token that acts as a key. Upon receiving a request for Emergency Auxiliary Services from PSAP 102, broker 108 locates all EASPs 110, 112, 114 that relate to the extant emergency event with which the token is associated.

Broker 108 may be equipped with a store 109 in which tokens may be stored according to their matching EASP 110, 112, 114. When broker 108 seeks Emergency Auxiliary Services in connection with an extant emergency service event, broker 108 can use the token received from PSAP 102 (for example) to query store 109 to identify which EASP 110, 112, 114 should be contacted regarding provision of an Emergency Auxiliary Service related to the received token.

Alternatively, each respective EASP may have a store in which are stored tokens associated with the respective EASP. In such an alternate configuration, EASP 110 has a store 111, EASP 112 has a store 113 and EASP 114 has a store 115. In the alternate configuration, broker 108 sends a broadcast communication to all of EASPs 110, 112, 114, rather than selecting one EASP based upon the token received from PSAP 102. Each EASP 110, 112, 114 receives the token from broker 108 and consults its respective store 111, 113, 115 to determine whether the received token has a relation to the respective EASP 110, 112, 114. This system works when tokens are pre-registered for each EASP 110, 112, 114. If, for example, the token sent by PSAP 102 to broker 108 relates to an Emergency Auxiliary Service provided by EASP 112 when EASP 112 consults its store 113 the received token will be noted as pertaining to a particular Emergency Auxiliary Services provided by EASP 112. EASP 112 will then respond by providing the identified Emergency Auxiliary Service, as indicated by arrow 122. In the exemplary situation described, EASPs 110, 114 will not discover the received token in their respective stores 111, 115, and no service will be provided by either of EASP 110, 114. Whenever a token pertaining to EASP 110 and stored in store 111 is received by EASP 110, EASP 110 responds by providing the identified Emergency Auxiliary Service, as indicated by arrow 120. Whenever a token pertaining to EASP 114 and stored in store 115 is received by EASP 114, EASP 114 responds by providing the identified Emergency Auxiliary Service, as indicated by arrow 124.

A key or token permits Emergency Auxiliary Services to be associated with a characteristic of the requesting party. One example of such a key or token is the telephone number (TN) of the requesting party who calls requesting Emergency Auxiliary Services. However, a key may also be associated with any type of identification of a location from which or communication device by which a service requester contacts public safety authorities. Examples of such locations or communication devices that may be associated with keys include, by way of example and not by way of limitation, wired phone, wireless phone, VoIP (Voice over Internet Protocol) phone, PDA (Personal Digital Assistant), MAC (Media Access Control) Address, URL (Universal Resource Locator) Internet Address, WiFi (Wireless Local Area Network), WiMAX (wireless interoperability metropolitan area access), personal area network such as Blue Tooth or 802.15, wireless enabled laptop computer, interactive TV system or another location or communication device. Moreover, keys or tokens do not need to be restricted to being associated with locations or communication devices, keys may also be associated with a participant in an emergency event, Thus, a key may be a social security number of an individual person, an employee identification number, a driver's license number or a similar individual-identifying number or code.

A broker involved in a distributed asset environment or architecture for using the present invention, such as broker 108 (FIG. 2) is a significant improvement over today's emergency service provider systems. In today's emergency service provider systems only limited information is available to a PSAP when an ALI node is queried. Today's ALI (Automatic Location Identification) facilities are embodied in a database that correlates a telephone number (TN) with a geographic location for the TN. When a call is received by a PSAP (Public Safety Answering Point), an ANI (Automatic Number Identification) code is presented along with the voice communication. The ANI code is associated with the communication device that is used to call the PSAP and is usually the calling device's 10-digit telephone number. One may recognize that the provision of an ANI code with an incoming call to a PSAP is similar to the now-familiar Caller ID service provided by telephone companies. Because the telephone service providers knew where they installed wired telephones, the telephone company's own records formed the basis for the ALI system, using the ANI as the basis for determining location of a particular phone used to call a PSAP.

With the introduction of non-wired phones, such as wireless phones, VoIP phones and other communication devices not wired to a telephone network, the location or identification of a caller or service requester is not so easily resolved as searching a telephone company's records using the caller's telephone number—as is accomplished using the ANI-ALI system of today. For example, determining the location of a wireless phone caller involves an ALI node querying another facility, such as an MPC (Mobile Positioning Center) to ascertain location of a wireless phone caller.

A broker function, embodied in broker 108 (FIG. 2) provides a robust structure to increase availability of Emergency Auxiliary Services in a system 100 in which each notification service, each location determining service and even each ALI database may be regarded and treated as an Emergency Auxiliary Service Provider (EASP1 though EASPm; FIG. 2). Using such a broker-involved system architecture, an unlimited number of EASPs may be available to a PSAP by the PSAP simply querying a broker 108 using a token or key associated with the extant emergency event.

Each respective EASPm will have pre-registered with the broker a list of tokens or keys for which the respective EASP can provide Emergency Auxiliary Service, such as notification service, provision of supplemental data to the PSAP usable by the PSAP or by first responders, or another service. Preferably, this pre-registration is effected using a subscription arrangement between one or more respective EASPm and an individual service requester. Broker 108 may participate in this subscription process, or the subscription process may be carried out directly between a service requester and each individual respective EASPm. Other subscription arrangements may also be employed, such as an arrangement involving an ISP (Internet Service Provider), a telephone service provider, or other parties. Pre-registered tokens are stored in store 109. As described earlier hereinabove, tokens may be stored in respective stores 111, 113, 115 associated with each respective EASPm 110, 112, 114. The token or key is used in system 100 to determine which respective EASPm 110, 112, 114 may have data or services relevant to an extant emergency event (more than one EASPm 110, 112, 114 may have data or services related to the extant emergency event).

The token or key is preferably associated with a participant, a location or a communication device used to request emergency service. Other bases for establishing tokens or keys may also be developed. That is, a token or key used with distributed asset architecture system 100 is assigned before an emergency event occurs and is usually associated with an individual or a device. However, multiple tokens may also be associated with a single individual or a device, where different tokens are used to differentially opt-in or cancel Emergency Auxiliary Services based on the type or severity of emergency services requested. There can be several tokens or keys associated with a single respective emergency event. A respective token or key may also be associated with more than one event, as in the situation where a Good Samaritan caller (identified with an associated token) calls for emergency services on witnessing an automobile accident (first event) and thereafter witnesses a house fire (second event). Finally, one class of tokens may be associated with a participant or location of communication device used to request emergency service, and another class of tokens may be used to alter or amend the Emergency Auxiliary Services based on the type or severity of emergency, or based on the expressed preferences of the emergency participant, e.g. the caller. In such cases, the PSAP or emergency services system may receive the caller's preferences either verbally or via non-verbal communication or altered dialing sequence. The emergency participant may then send in sequential token-originated signals, such as a first token-originated signal associated with the participant or device and a second token-originated signal to amend the types of Emergency Auxiliary Services requested.

Figure 3:
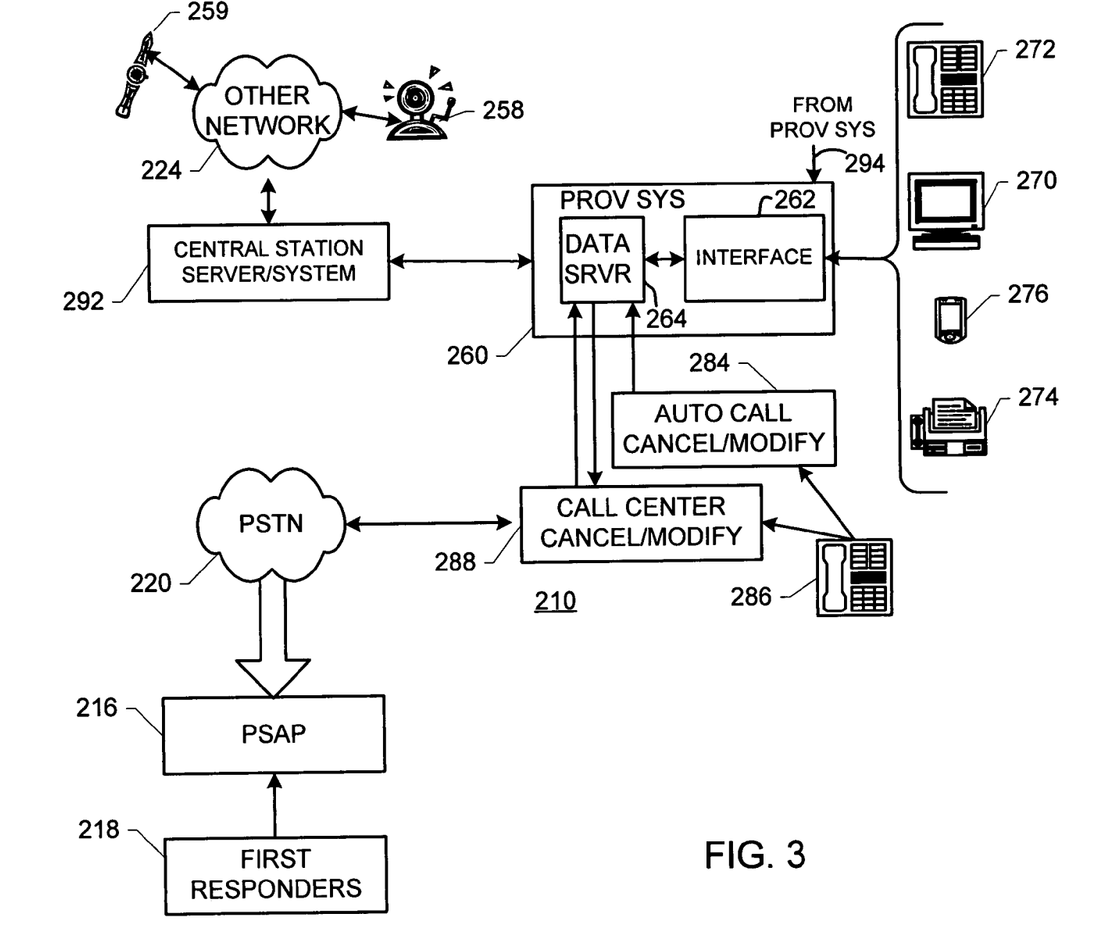
FIG. 3 is a schematic diagram illustrating an alternate embodiment of the apparatus of the present invention.

FIG. 3 is a schematic diagram illustrating an alternate embodiment of the apparatus of the present invention. In FIG. 3, a provisioning system 260 is coupled with a Central Station Server/System 292 associated with a Central Station Alarm or Personal Emergency Response System (PERS) service provider system 210. A subscriber's residential or business alarm system or sensor 258 or PERS medallion 259, e.g. pendant or watch, is connected with Central Station Server/System 292 via any numbered of wired or non-wired technologies represented by Other Network 224. Central Station Server/System 292 may be programmed to automatically send emergency call requests directly to a public safety network (not shown in FIG. 3). Such a connection with a public safety network may be effected as described earlier herein in connection with describing FIG. 1, that is connection via Selective Router 12. Central Station Server/System 292 may be integrated with an ESME (e.g. ESME 14; FIG. 1) to receive Automated Location Information (ALI) or related services.

With today's public safety network, it is preferable that such an emergency services request from PERS medallion 259 or alarm system 258 is processed initially by Central Station Server/system 292 and then either all emergency requests or those meeting certain criteria are routed to a Call Center 288. Then Call Center 288 initiates an emergency services request through a PSTN 220 directly (not through a Selective Router, e.g., Selective Router 12; FIG. 1) to a PSAP 216. Central Station Server/System 292 may automatically initiate Emergency Auxiliary Services based on preferences set up by a home or business subscriber and submitted to a provisioning system 260 by any of the aforementioned technologies discussed in connection with emergency service call system 10 (FIG. 1), including by way of example and not by way of limitation, a computer 270, a phone 272, a facsimile machine 274 and a PDA 276. Alternatively, Central Station Alarm Server/System 292 may employ call center 288 or an automated system 284 to initiate notification services to the subscriber, and then the subscriber may contact call center 288 or access system 210 via pre-programmed codes to determine additional Emergency Auxiliary Services to be initiated based on the emergency service request detected by the home or business alarm system or sensors. In the case of a PERS emergency service request, an attendant (not shown in FIG. 3) at Call Center 288 may access a subscribers' personal preferences or medical records in provisioning system 260 to determine whether to pass the emergency request onto PSAP 216 with our without Emergency Auxiliary Services initiated by the attendant. These preferences may have been submitted by the subscriber via any of the aforementioned technologies including by way of example and not by way of limitation, a computer 270, a phone 272, a facsimile machine 274 and a PDA 276. Alternatively, the attendant at Call Center 288 may confirm the subscriber's preference by directly speaking with the subscriber at the time of the emergency services request.

Figure 4:
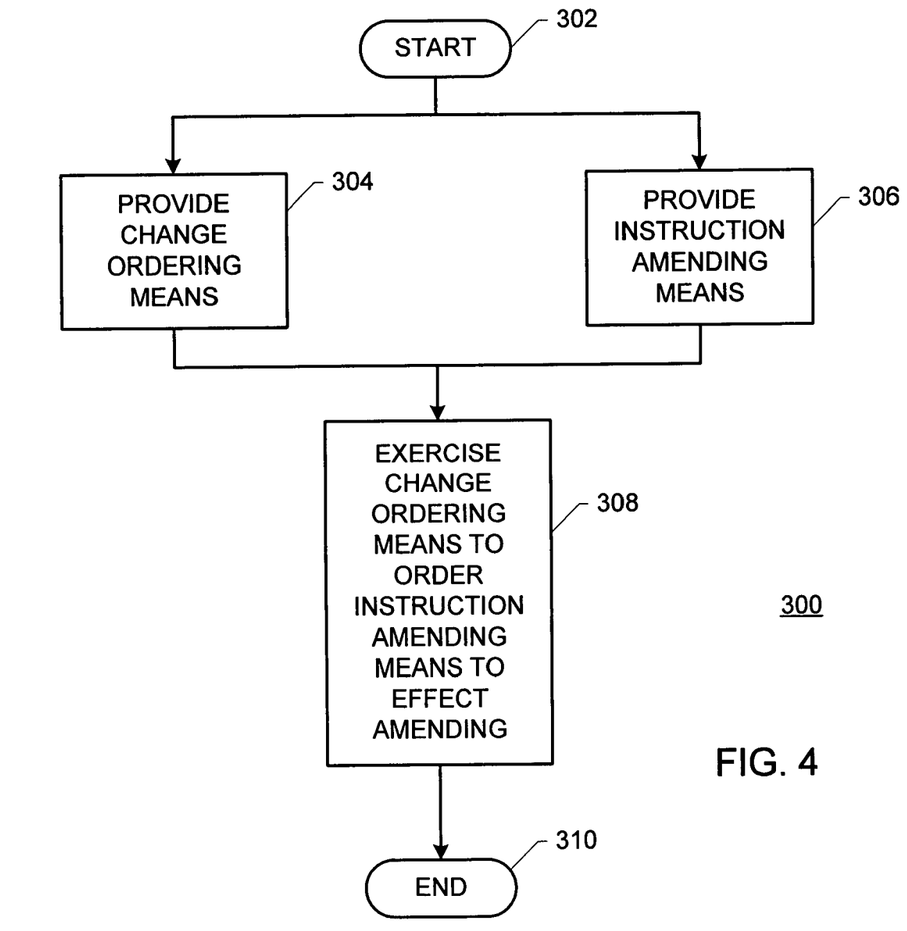
FIG. 4 is a flow diagram illustrating the method of the present invention.

FIG. 4 is a flow diagram illustrating the method of the present invention. In FIG. 4, a method 300 for amending implementation instructions for Emergency Auxiliary Services begins at a START locus 302. The Emergency Auxiliary Service effects action according to the implementation instructions to at least one predetermined receiver after a triggering communication is placed from a subscribing communication instrument. Method 300 continues with the step of, in no particular order: (1) Providing a change ordering means for effecting the amending, as indicated by a block 304. The change ordering means is exercised by the subscribing communication instrument. (2) Providing an instruction amending means coupled with the subscribing communication instrument, as indicated by a block 306. The instruction amending means responds to the change ordering means to effect the amending. Method 300 continues by exercising the change ordering means to order the instruction amending means to effect the amending, as indicated by a block 308. Method 300 terminates at an END locus 310.

One may learn from this disclosure that the present invention employs a communication instrument embodied in a communication device such as phone 30, phone 36, mobile or wireless phone 36, personal computer (PC) 50, VoIP phone 52, PDA 54 or another communication device capable of communicating over various networks including a Public Switched Telephone Network (PSTN) 20, with or without participation of additional networks (e.g., PBX network 22, other networks 24), as described in connection with FIG. 1.

One may also learn from this disclosure that the present invention employs a notification means embodied in a voice message to a human operator to an IVR (Interactive Voice Response) system, a predetermined series of entries using a key pad, keyboard or other data entry device.

One may learn from this disclosure that the present invention employs an altering means embodied in a human operator having a capability or equipment to interface with data stored for an Emergency Auxiliary Services system, an automated data access system having a capability to interface with data stored for an Emergency Auxiliary Services system, or another facility, program or capability to automatically interface with data stored for an Emergency Auxiliary Services system.

One may further learn from this disclosure that the present invention employs a change ordering means embodied in a voice message to a human operator to an IVR (Interactive Voice Response) system, an ASR (Automatic Speech Recognition) system, a predetermined series of entries using a key pad, keyboard or other data entry device.

One may still further learn from this disclosure that the present invention employs an instruction amending means embodied in a human operator having a capability or equipment to interface with data stored for an Emergency Auxiliary Services system, an automated data access system having a capability to interface with data stored for an Emergency Auxiliary Services system, or another facility, program or capability to automatically interface with data stored for an Emergency Auxiliary Services system.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A system for use by a service requester after said service requester communicates an emergency service request to an emergency service answering point; the system comprising:
    an emergency auxiliary service entity separate from said emergency service answering point that carries out implementation steps responsive to said emergency service request;
    a communication entity subscribingly associated with said emergency auxiliary service;
    an alerting means used by said service requester employing said communication entity for generating an indication of a need for altering said emergency service request; and
    an altering means coupled with said communication entity and responding to said indication to effect said altering.

2. A system for use by a service requester for altering implementation steps carried out by an emergency auxiliary service after said service requester communicates an emergency service request as recited in claim 1 wherein said communication entity is a telephone coupled with a telecommunication network.

3. A system for use by a service requester for altering implementation steps carried out by an emergency auxiliary service after said service requester communicates an emergency service request as recited in claim 1 wherein said communication entity is a communication device coupled with an internet protocol communication network.

4. A system for use by a service requester for altering implementation steps carried out by an emergency auxiliary service after said service requester communicates an emergency service request as recited in claim 1 wherein said communication entity is a wireless communication device coupled with a wireless communication network.

5. A system for use by a service requester for altering implementation steps carried out by an emergency auxiliary service after said service requester communicates an emergency service request as recited in claim 2, 3 or 4 wherein said alerting means is a predetermined character combination entered by said service requester engaging at least one switch.

6. A system for use by a service requester for altering implementation steps carried out by an emergency auxiliary service after said service requester communicates an emergency service request as recited in claim 2, 3 or 4 wherein said alerting means is a voice message spoken by said service requester.

7. A system for use by a service requester for altering implementation steps carried out by an emergency auxiliary service after said service requester communicates an emergency service request as recited in claim 5 wherein said altering means is a human operator.

8. A system for use by a service requester for altering implementation steps carried out by an emergency auxiliary service after said service requester communicates an emergency service request as recited in claim 6 wherein said altering means is a human operator.

9. A system for use by a service requester for altering implementation steps carried out by an emergency auxiliary service after said service requester communicates an emergency service request as recited in claim 5 wherein said altering means is at least one information storing device storing a plurality of data relating to said implementation steps; said at least one information storing device responding to said indication to alter selected data of said plurality of data.

10. A system for use by a service requester for altering implementation steps carried out by an emergency auxiliary service after said service requester communicates an emergency service request as recited in claim 6 wherein said altering means is at least one information storing device storing a plurality of data relating to said implementation steps; said at least one information storing device responding to said indication to alter selected data of said plurality of data.

11. A method for amending instructions for emergency auxiliary services comprising:
    receiving notification at an emergency auxiliary services system responsive to an emergency service request to an emergency services answering point made by a service requester;
    receiving a change order; and
    amending said emergency auxiliary services system's instructions in accordance with said change order.

12. A method in accordance with claim 11 wherein receiving a change order comprises receiving a change order from said service requester.

13. A method in accordance with claim 11 wherein receiving a change order comprises receiving a change order from an entity other than said service requester.

14. A method in accordance with claim 11 wherein said change order comprises an order to cancel emergency auxiliary services and wherein amending said emergency auxiliary services system's instructions comprises instructing the emergency auxiliary service system to cancel emergency auxiliary services.

15. A method in accordance with claim 11 wherein said change order comprises an order to opt-in to emergency auxiliary services and wherein amending said emergency auxiliary services system's instructions comprises instructing the emergency auxiliary service system to perform emergency auxiliary services.

16. A method in accordance with claim 11 wherein receiving notification responsive to an emergency service request and receiving a change order occur approximately simultaneously.

17. A method in accordance with claim 11 wherein receiving a change order occurs subsequent to receiving notification responsive to an emergency service request.

18. A method in accordance with claim 11 wherein receiving a change order comprises receiving dual-tone, multi-frequency signals.

19. A method in accordance with claim 11 wherein receiving a change order comprises receiving verbal commands.

20. A method in accordance with claim 11 wherein said emergency auxiliary services system includes an information store that stores a plurality of data relating to said instructions; said method further including:
    altering selected data of said plurality of data responsive to amending said emergency auxiliary services system's instructions.

* * * * *